H. F. SMITH.
PURIFICATION OF GAS.
APPLICATION FILED JAN. 29, 1917.
1,379,056.
Patented May 24, 1921.
2 SHEETS—SHEET 1.
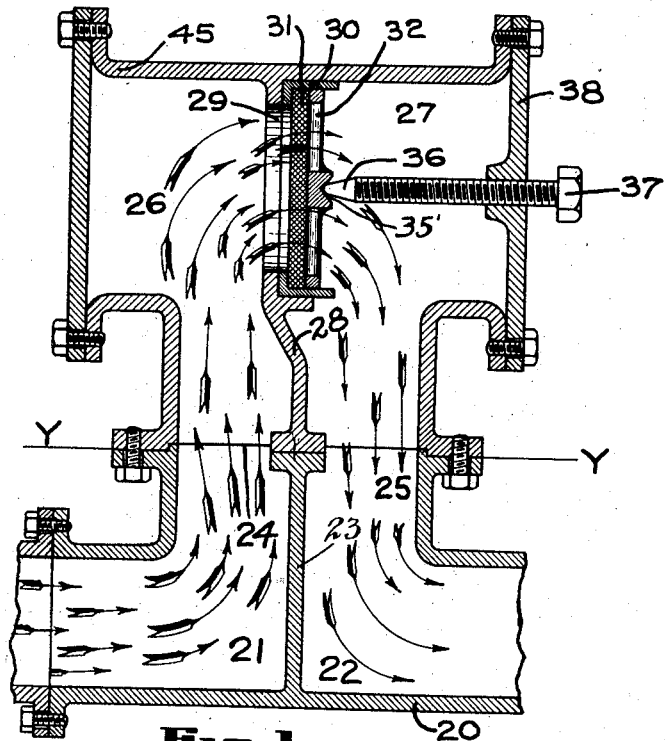
Fig. 1.
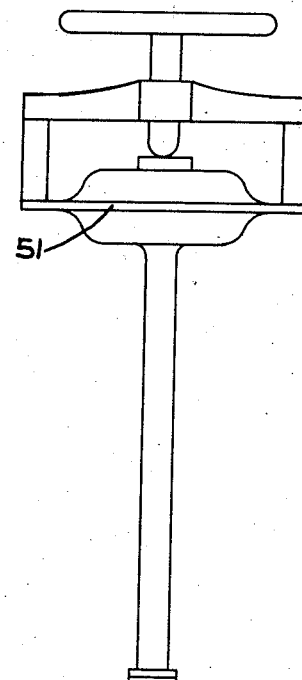
Fig. 2.
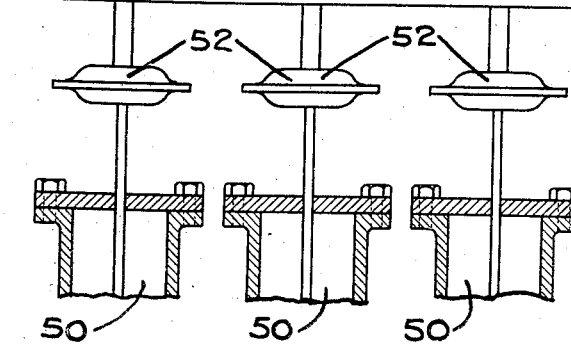
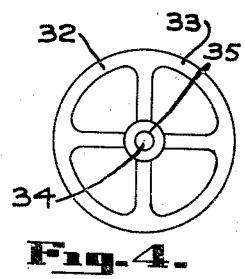
Fig. 4.
Witnesses
Inventor
Harry F. Smith.
Attorneys

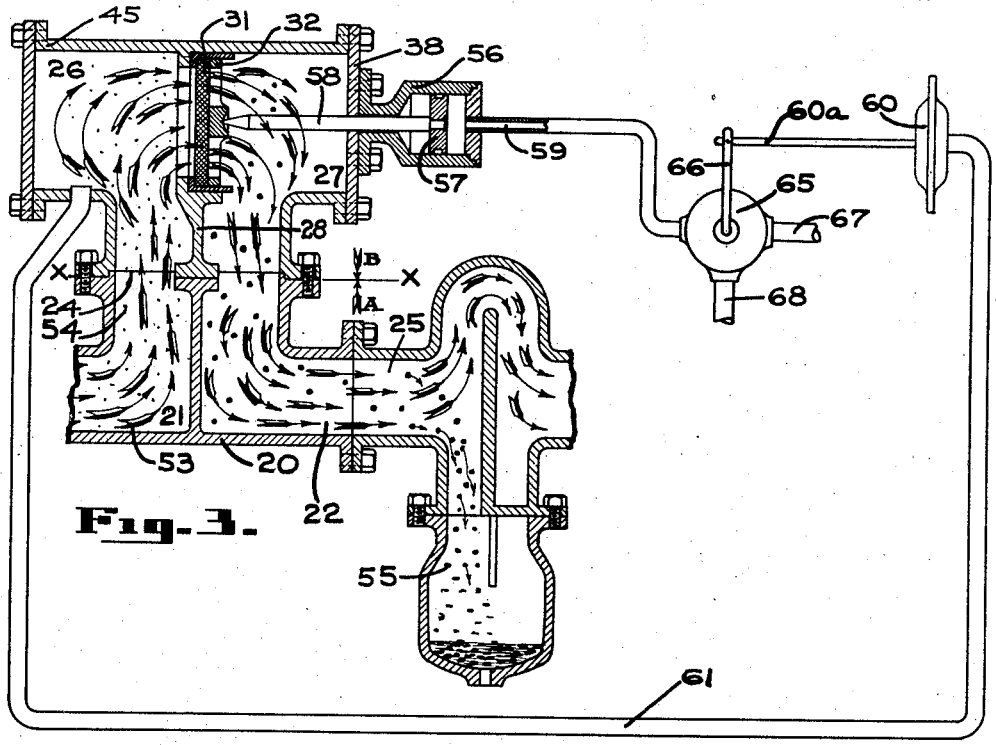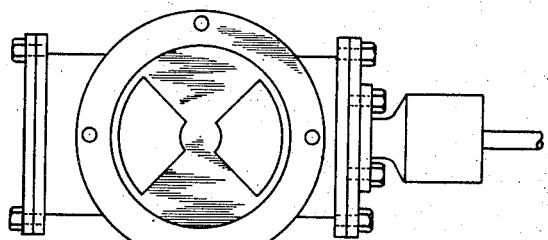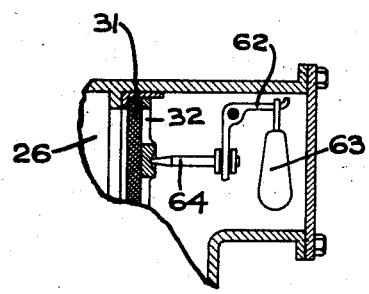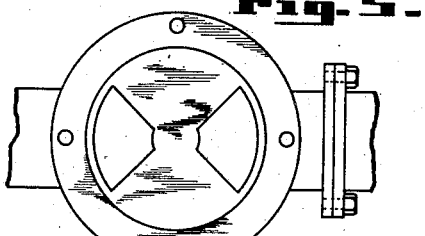

UNITED STATES PATENT OFFICE.

HARRY F. SMITH, OF LEXINGTON, OHIO, ASSIGNOR, BY MESNE ASSIGNMENTS, TO THE GAS RESEARCH COMPANY, OF DAYTON, OHIO, A CORPORATION OF OHIO.

PURIFICATION OF GAS.

1,379,056.  Specification of Letters Patent.  Patented May 24, 1921.

Application filed January 29, 1917. Serial No. 145,314.

*To all whom it may concern:*

Be it known that I, HARRY F. SMITH, a citizen of the United States of America, residing at Lexington, in the county of Richland, and State of Ohio, have invented certain new and useful Improvements in the Purification of Gas, of which the following is a full, clear, and exact description.

This invention relates to improvements in apparatus for purifying gas, and more specifically to that type of gas purifying apparatus wherein the gas is passed through a pervious diaphragm for cleaning purposes.

In my Patents Numbers 1099773 and 1140198, bearing dates respectively of June 9, 1914, and May 18, 1915, is set out a method of purifying gas and a type of apparatus for carrying that method into effect. The method of purification therein set out is based on the fact that if a gas containing such impurities therein as tar is passed through a diaphragm of spun glass, or some analagous substance, at a suitable velocity, a coalescence or agglomeration of the particles of impurity will take place with the production of particles of such substantial size that they will readily separate out under the action of gravity, when carried out of the diaphragm by the current of gas. To insure most effective operation of this method the velocity of the impure gas through the diaphragm should be constant. And to insure such a constant velocity it is necessary to maintain the differential pressure on opposite sides of the diaphragm constant. Under actual operating conditions the volume of flow of gas through a conducting main is variable, and the velocity of flow of the gas through a pervious diaphragm inserted in such main undergoes corresponding variations. In order to counteract these variations I vary the density of the pervious diaphragm to increase or decrease its resistance to flow and thus maintain substantially uniform the velocity of flow of the gas therethrough. In other words, I vary the resistance of the diaphragm to flow therethrough to maintain the drop in pressure thereacross, or the differential pressure upon opposite sides thereof, substantially constant. This condition insures a substantially constant velocity of flow of gas through the diaphragm. That is to say, the velocity of the flowing gas while actually within the pervious diaphragm is thus maintained substantially uniform.

One object of the present invention, therefore, is to provide an improved method of gas purification in which the purifying effect is produced by passing the impure gas at a suitable velocity through a pervious diaphragm, which diaphragm is so arranged that the resistance thereof to the flow of gas may be so controlled as to insure a uniform velocity of flow through the diaphragm by maintaining a constant differential pressure on opposite sides thereof, to thereby cause the degree of coalescence of the particles of impurity in the gas to remain substantially constant, regardless of variations in the volume of gas flowing through the diaphragm, or of the actual pressure existent upon opposite sides thereof.

Further objects and advantages will be apparent from the following description, reference being had to the accompanying drawings, wherein several preferred embodiments of the present invention are clearly set forth.

In the drawings:

Figure 1 is a view in section showing means whereby the purifying device is manually adjusted for varying gas pressures in the gas main.

Fig. 2 is a view partly in section and partly in elevation wherein a manually operated element is shown, capable of controlling a series of purifying devices at the same time.

Fig. 3 is a view partly in section and partly in elevation and illustrates a system for automatically controlling the purifying device.

Fig. 4 is a detail view of the clamping spider used in connection with the purifying device.

Fig. 5 is a view taken in the direction of the arrow "A" along the line "x—x" of Fig. 3.

Fig. 5ª is a view taken in the direction of the arrow "B" along the line "x—x" of Fig. 3.

Fig. 6 is a view setting forth another automatic controlling system for the purifying device.

Referring to the drawings and more particularly to Figs. 1 and 4, there is shown a purifying device including a casing 20 which is provided with chambers 21 and 22, said chambers being separated from one another by the partition 23.

Chamber 21, which may be termed the intake chamber, is adapted to be connected to any source of unclean gas to be cleaned. This chamber is provided with an outlet port 24, while the chamber 22 is provided with an inlet port 25.

A cage 45 is mounted upon the casing 20 in such manner as to permit the cage to be rotated relative to said casing and yet make a gas-tight fit obtainable. This cage 45 is provided with chambers 26 and 27, which are separated by the partition 28, and are adapted to communicate with the chambers 21 and 22 of the casing 20.

The structure of the contacting surfaces of both the cage 45 and the casing 20, along the line "$y-y$" (see Fig. 1), has been clearly described, illustrated and claimed in my Patent No. 1,099,773, dated June 9, 1914, and it is therefore deemed unnecessary to give a further detailed description of this structure.

The numeral 29 designates the opening in the partition 28. A cup-shaped element 30 is provided, having an opening adjacent to and concentric with the opening 29, which forms a receptacle for the pervious diaphragm 31. In order that this pervious diaphragm may be held in correct position, there is provided a clamping spider 32 (see Figs. 1 and 4), said clamping spider having an outer ring portion 33 and an inner bearing 34 connected together by means of the spokes 35. This inner bearing 34, has a depressed portion 35', which is adapted to receive the pointed end 36 of the adjusting element 37, which is in turn adapted to be screwed into an enlarged head portion formed on the end cover 38 of the cage 45.

As is set forth in my above-mentioned patent, the diaphragm 31 may be of various materials, such as stiff elastic fibers of hair, sheep's wool, spun glass and the like, all of which are of a filamentous character.

The object of the pervious diaphragm, which constitutes the active element of this apparatus in purifying gas, is as mentioned in my previous patent cited heretofore, not to remove the tar from the gas, but to bring about such a combination and agglomeration of the extremely small tar particles that they will then be too large to be carried forward by the gas current and will readily drop out and separate from the gas under the action of gravity. This type of diaphragm or pad is designated generally as "non-filtering," to distinguish it from the ordinary filter pad in which the impurities are separated within the pad itself.

In order to bring about this desired coalescence of the particles of impurity it is necessary to pass the gas through the diaphragm at a sufficiently high velocity to cause them to adhere to the filaments constituting the diaphragm upon contacting therewith. In this way a fluid film is formed upon and between the fibers or filaments which will be carried out of the diaphragm by the flowing gas in drops of substantial size, which will later separate out through their own weight. To secure the greatest efficiency with this purifying apparatus it is necessary to maintain substantially constant the velocity of flow of the gas through the diaphragm, regardless of variations in the volume of gas. In order to accomplish this the drop of pressure through the diaphragm, in other words the differential pressure on opposite sides thereof, is maintained constant by properly varying the density of the diaphragm, and so the resistance to flow therethrough. To secure this variation of density the adjustable element 37 is provided which coöperates with the spider 32. Axial movement of element 37 toward the spider 32 causes a compression of the diaphragm with consequent increase in the density thereof, while movement in the opposite direction decreases the compressive effect of the spider, thus permitting a decrease in the density of the diaphragm.

When the differential pressure across the diaphragm varies because of the pressure in the chamber 26 increasing relative to the pressure in the chamber 27 the velocity of flow of the gas will increase. By moving the element 37 in such wise as to decrease the pressure of the spider 32 upon the diaphragm the resistance of such diaphragm to the flow of gas therethrough will be decreased. This will result in a return toward the normal drop of pressure through the diaphragm with a consequent return toward the normal velocity of flow of the gas. If the drop in pressure across the diaphragm varies because of the pressure in the chamber 26 decreasing relative to the pressure in the chamber 27, the velocity of flow of the gas will decrease. It then becomes necessary to so move the element 37 as to increase the pressure on the diaphragm with a consequent building up in the differential pressure and a corresponding increase in the velocity of flow of the gas. It is thus seen that by properly positioning the element 37 the degree of compression, or density, of the diaphragm may be varied to secure any desired velocity of flow of the gas therethrough.

In Fig. 2 there is shown a system of control, including a hand operated diaphragm valve 51, which is associated with a series of diaphragm valves 52. These valves 52 are in turn connected to the cleaning devices of the different gas producer sections.

It may be readily seen that it would be practically impossible to secure exactly the same adjustment on the different cleaning devices mentioned in the preceding paragraph, by the individual operation of the adjusting element on each of said cleaning devices.

In order to secure this uniformity of adjustment, the aforementioned hand operated valve 51 and its associated valves 52 are provided in combination with the devices for cleaning whereby when the said valve 51 is operated, each of the various valves 52 will be operated to substantially affect its individual cleaning member in the same degree as the others, thereby making the entire adjustment substantially uniform.

Referring to the Fig. 3, there is shown a system wherein the adjustment of the pervious diaphragm 31 is automatically controlled by conditions within the chamber 26. In this figure, as well as Fig. 1, the direction of the flow of the gas is shown by the arrows 53.

The numeral 54 designates the small tar particles before passing through the diaphragm, while the numeral 55 designates the conglomerated tar particles after having passed through the diaphragm.

In the form of apparatus shown in this figure there is provided a cylinder 56, secured to the end cover 38 in any suitable manner. This cylinder 56 has a piston 57, which, by means of the stem 58, is adapted to coöperate with the clamping spider 32, in a manner the same as the adjusting screw 37 described heretofore relative to Fig. 1.

A pipe 59, connects the cylinder 56 with a valve 65, which in turn is connected to a diaphragm valve 60 by the stem 60ᵃ.

This diaphragm valve 60 is in communication with the inlet chamber 26, through the pipe connection 61, said valve being adapted to be operated by the variation of the gas pressure within the aforementioned chamber 26. That is, when the gas pressure in the chamber 26 increases, the diaphragm valve 60 will be operated in one direction while when the gas pressure in said chamber decreases the valve will be operated in the opposite direction.

The operation of the diaphragm valve 60 is adapted to control the operation of the valve 65, so that when the valve stem 66 is operated in one way or the other, water will either be permitted to flow from the supply pipe 67 through the valve to the pipe 59, and thereby exert pressure on the piston 57, or from the cylinder 56 through pipe 59 and valve exhaust pipe 68 to release the pressure on the piston.

Suppose the gas pressure in the chamber 26 increases relative to the pressure in the chamber 27. Under the circumstances, as has been mentioned heretofore, it is desirable, in order to decrease this relative rise in gas pressure to decrease the pressure of the stem 58, upon the clamping spider 32, and thereby permit the pervious diaphragm to expand.

The operation of the diaphragm 60 in accordance with the relative increase of pressure in chamber 26 will result in so controlling the valve 65 that the pressure exerted upon the piston 57 will be reduced, thereby permitting the piston 57 and its stem 58, to release or reduce the pressure upon the clamping spider 32, and thus permit the pervious diaphragm 31 to expand and consequently reduce the drop in pressure through the diaphragm. The operation of the valve 65 may be controlled by proper adjustment of the diaphragm valve 60 so that any increase or decrease in the differential pressure across the diaphragm will result in such variation of the compression thereof as will bring about a return to normal conditions.

In the Fig. 6, there is shown a still further modification of the automatic control of the pervious diaphragm. In this case a bell-crank lever 62 is provided, having a weight 63 and a stem 64, said stem being associated with the clamping spider 32.

In the present instance, as soon as the differential pressure of the gas increases above normal, it will have a tendency to push the spider 32 out of normal position, thereby raising the weight 63 and permitting the fibers in the diaphragm 31 to expand.

As soon as the differential pressure of the gas decreases, the weight element 63 will tend to move the spider 32 back to normal position and thereby compress the diaphragm 31, to adjust same for this decrease.

The Figs. 5 and 5ᵃ illustrate the contacting faces of the cage 45 and the casing 20, which as has been clearly illustrated and claimed in my previous Patent No. 1,099,773, dated June 9, 1914, provide means whereby the cage 45 may be rotated, relative to the casing 20, thereby reversing the flow of gas through the diaphragm 31 for the purposes described in the existing patent.

While the form of mechanism herein shown and described constitutes a preferred form of embodiment of the invention it is to be understood that other forms might be adopted all coming within the scope of the claims which follow.

What I claim is as follows:

1. A method of purifying gases which consists in passing the gas through a pervious diaphragm, and varying the density of such diaphragm to keep substantially constant the differential pressure on opposite sides thereof.

2. The method of purifying fluids, which consists in passing the fluid through a pervious non-filtering diaphragm; and varying the density of said diaphragm to control the velocity of flow of the fluid within the diaphragm, to thus control the cleaning effectiveness of said diaphragm.

3. The method of purifying fluids, which consists in passing the fluid through a non-filtering filamentous pad, of spun glass or the like; and varying the density of said pad to maintain substantially constant the cleaning effectiveness thereof.

4. In a gas purifying system, a non-filtering diaphragm; and means associated with said diaphragm for varying the density to control the cleaning effectiveness thereof.

5. In a system for cleaning impurity containing fluids, such as producer gas and the like, a filamentous diaphragm, of spun glass or the like; and means associated with said diaphragm for controlling the cleaning effectiveness of the diaphragm by changing the density thereof to control the velocity of flow of the gas within said diaphragm.

6. In a gas purifying system, a cage having inlet and outlet openings; a non-filtering pervious diaphragm within the cage and between said openings; a clamping spider associated with the pervious diaphragm; and means coöperating with said spider to vary its positioning, to vary the density of the pervious diaphragm to thus control the cleaning effectiveness thereof.

7. In a gas purifying system, a cage having inlet and outlet openings, a nonfiltering pervious diaphragm so mounted in the cage that the gas must pass therethrough, and automatic means operable to affect the diaphragm, whereby its resistance to flow therethrough will be varied to control the cleaning effectiveness of said diaphragm.

8. In a controlling device for a gas purifying system, the combination with a cage having inlet and outlet chambers associated with mains for bringing in and carrying out the gas from said cage; of a receptacle mounted between the inlet and outlet chambers; a pervious diaphragm carried by said receptacle; means associated with the inlet chamber of the cage and adapted to be brought into operation by the varying gas pressure in said chamber; and intermediate means adapted to be operated by the aforementioned means associated with the inlet chamber of the cage, to affect the clamping spider associated with the pervious diaphragm to either increase or decrease the density of the diaphragm for purposes set forth.

9. The method of removing liquid impurities from a gas, which consists in passing the gas through a fixed pervious medium, adapted to cause the particles of liquid to coalesce, and varying the density of such pervious medium to keep substantially constant the differential pressure on opposite sides thereof.

10. The method of removing tar particles from a gas which consists in passing the tar laden gas through a filamentous diaphragm, adapted to cause coalescence of said tar particles, varying the density of said diaphragm to maintain substantially constant the differential pressure upon opposite sides thereof, and separating the coalesced particles of tar.

11. In a gas purifying system, a cage having inlet and outlet openings; a non-filtering pervious diaphragm within the cage and between said openings; a clamping spider associated with the pervious diaphragm; and means responsive to variations of pressure within the cage, for automatically affecting the positioning of said spider to vary the density of the pervious diaphragm to thus control the cleaning effectiveness thereof.

In testimony whereof I affix my signature in the presence of two subscribing witnesses.

HARRY F. SMITH.

Witnesses:
WALTER W. RIEDEL,
OTTIS D. MOWRY.